US008050845B2

(12) United States Patent
Katsura

(10) Patent No.: US 8,050,845 B2
(45) Date of Patent: Nov. 1, 2011

(54) FUEL PRESSURE CONTROLLER AND FUEL PRESSURE CONTROL SYSTEM

(75) Inventor: Ryo Katsura, Okazaki (JP)

(73) Assignee: Denso Corporation, Kariya (JP)

(*) Notice: Subject to any disclaimer, the term of this patent is extended or adjusted under 35 U.S.C. 154(b) by 438 days.

(21) Appl. No.: 12/419,780

(22) Filed: Apr. 7, 2009

(65) Prior Publication Data

US 2009/0281707 A1 Nov. 12, 2009

(30) Foreign Application Priority Data

May 9, 2008 (JP) ................................. 2008-122978

(51) Int. Cl.
*F02D 41/30* (2006.01)
*F16K 31/06* (2006.01)
*F02M 51/00* (2006.01)

(52) U.S. Cl. ......................... 701/103; 123/447; 123/479

(58) Field of Classification Search .......... 701/103–105, 701/114, 115, 102; 123/447, 457, 445, 456, 123/479, 476
See application file for complete search history.

(56) References Cited

U.S. PATENT DOCUMENTS 5,619,969 A * 4/1997 Liu et al. ....................... 123/447
6,283,108 B1 9/2001 Matsufuji et al.
6,378,498 B2 4/2002 Kohketsu et al.
6,792,919 B2 9/2004 Kohketsu et al.
7,171,944 B1 * 2/2007 Oono et al. .................. 123/357
7,607,417 B2 * 10/2009 Achleitner et al. ........... 123/447
2002/0002964 A1 1/2002 Kohketsu et al.

FOREIGN PATENT DOCUMENTS

DE 10 2006 035464 7/2007
DE 10 2007 061228 6/2009
JP 10-47144 2/1998
JP 11125140 A * 5/1999
JP 2004-108171 4/2004
JP 2004-340034 12/2004
JP 2008-075452 4/2008
JP 2008-101546 5/2008
WO WO 01/81746 11/2001

OTHER PUBLICATIONS

Japanese Office Action dated Mar. 2, 2010, issued in corresponding Japanese Application No. 2008-122978, with English translation.
Extended European Search Report dated Sep. 18, 2009, issued in corresponding European Application No. 09157955.7-2311.

* cited by examiner

*Primary Examiner* — Hieu T Vo
(74) *Attorney, Agent, or Firm* — Nixon & Vanderhye PC

(57) ABSTRACT

An ECU estimates a variation amount of fuel which is actually suctioned by a fuel pump based on a fuel pressure in a common rail. Even though the fuel pressure in the common rail deviates from a target fuel pressure, when the estimated variation amount of fuel is substantially zero, an energization quantity to a solenoid of a flow control valve is compulsorily reduced.

9 Claims, 8 Drawing Sheets

FIG. 3
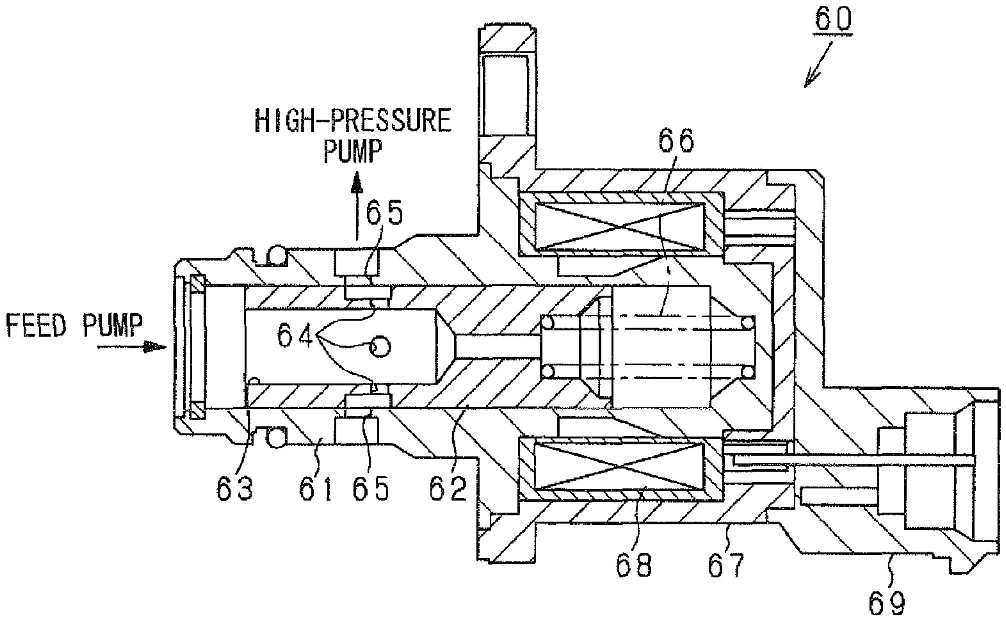
FIG. 5A
FIG. 5B
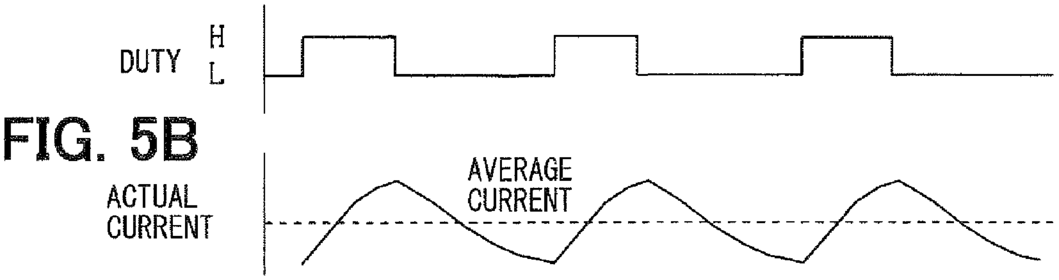

FIG. 6A1
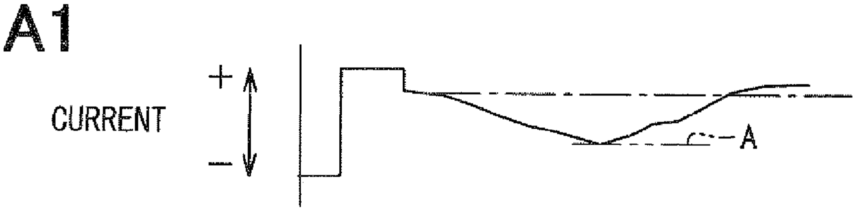
FIG. 6A2
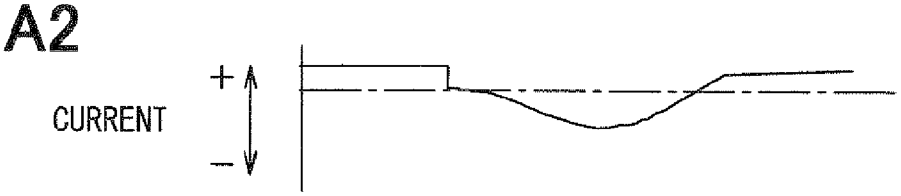
FIG. 6B1
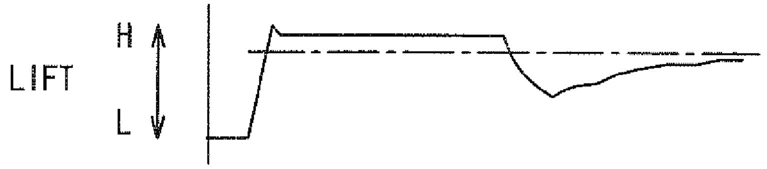
FIG. 6B2
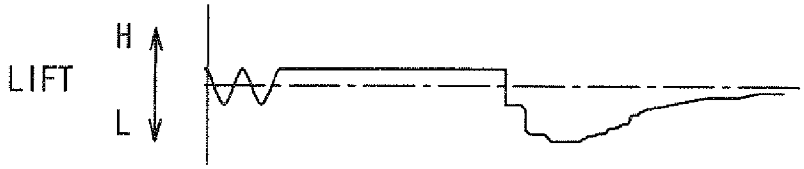
FIG. 6C1
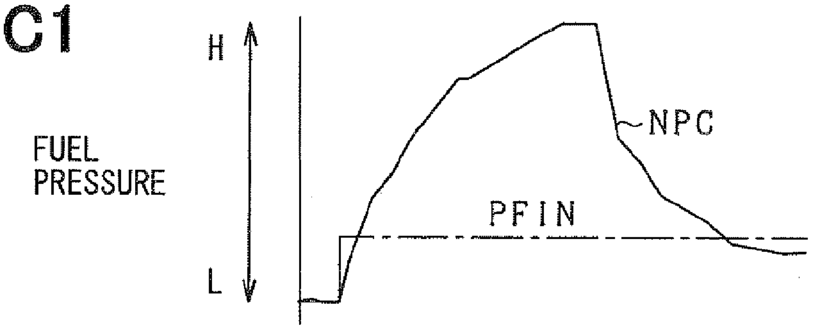
FIG. 6C2
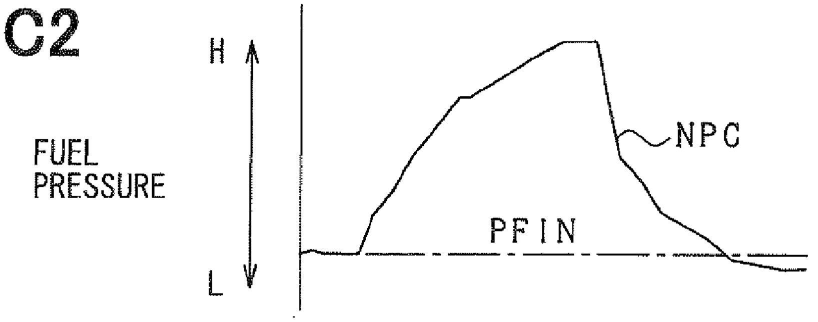

FUEL PRESSURE CONTROLLER AND FUEL PRESSURE CONTROL SYSTEM

CROSS-REFERENCE TO RELATED APPLICATION

This application is based on Japanese Patent Application No. 2008-122978 filed on May 9, 2008, the disclosure of which is incorporated herein by reference.

FIELD OF THE INVENTION

The present invention relates to a fuel pressure controller and a fuel pressure control system. The fuel pressure controller is provided to a fuel supply system which includes a fuel pump, an accumulator accumulating a pressurized fuel therein, and a pressure detector detecting a fuel pressure in the accumulator. The fuel pump has a flow control valve. The flow control valve includes a spool and adjusts a fuel quantity by displacing the spool by a magnetic force of a solenoid and a biasing force of a spring. The fuel pressure controller feedback controls an energization of the solenoid in such a manner that the detected fuel pressure in the accumulator agrees with a target pressure.

BACKGROUND OF THE INVENTION

Such a fuel pressure controller is applied to a common-rail type diesel engine. The fuel pressure controller adjusts a position of a spool of a fuel pump so that a discharge quantity of the fuel pump is controlled. Thereby, a fuel pressure in a common rail is controlled. The common rail is an accumulator common to each cylinder.

An inner periphery of the flow control valve and/or an outer periphery of the spool are worn away with age. The inventor of the present invention finds that a sliding friction which the spool receives increases when the spool slides on the inner periphery of the flow control valve. An increase in the sliding friction of the spool deteriorates an operationality of the spool, which deteriorates a controllability of the fuel pressure in the common rail.

JP-2008-75452A shows that electric current applied to the flow control valve is compulsorily decreased when the detected fuel pressure in the common rail has been significantly deviated from the target pressure for a predetermined period or more. This control is based on a fact that the detected fuel pressure deviates from the target pressure when the sliding friction of the spool increases. According to such a process, the spool is compulsorily displaced when the sliding friction of the spool increases, whereby the flow control valve can be appropriately operated.

There are various kinds of factors which deviate the detected fuel pressure in the common rail from the target pressure. Thus, it is necessary to monitor the deviation of the detected fuel pressure from the target pressure for a specified time period in order to correctly detect the sliding friction of the spool. It may take a long time period to detect an increase in the sliding friction of the spool.

SUMMARY OF THE INVENTION

The present invention is made in view of the above matters, and it is an object of the present invention to provide a fuel controller and a fuel control system capable of promptly detecting a malfunction of a flow control valve.

According to the present invention, a fuel pressure controller is provided to a fuel supply system which includes a fuel pump having a flow control valve for adjusting a fuel quantity by displacing a spool by means of a magnetic force generated by a solenoid and a biasing force generated by a spring, an accumulator accumulating a fuel discharged by the fuel pump, and a pressure detecting means for detecting a fuel pressure in the accumulator. The fuel pressure controller feedback controls a detected fuel pressure in the accumulator to a target pressure by an energization operation to the solenoid. The fuel pressure controller includes an estimating means for estimating a parameter indicative of a displacement amount of the spool based on a parameter for estimating a fuel quantity which is actually adjusted by the flow control valve. Further, the fuel pressure controller includes a detecting means for detecting a malfunction of the flow control valve based on a fact that the displacement amount corresponding to an estimation result by the estimating means is not more that a specified value in a situation that the detected fuel pressure deviates from the target pressure.

When the detected fuel pressure in the accumulator deviates from the target pressure, the spool is displaced by an energization operation of the flow control valve according to a feedback control. Therefore, although the detected fuel pressure in the accumulator has deviated from the target pressure, when the spool is not displaced, it is thought that the malfunctions have arisen in operation of the spool. According to the present invention, a malfunction of the flow control valve can be promptly detected.

BRIEF DESCRIPTION OF THE DRAWINGS

Other objects, features and advantages of the present invention will become more apparent from the following description made with reference to the accompanying drawings, in which like parts are designated by like reference numbers and in which:

FIG. 3 is a cross sectional view showing a suction control valve according to the first embodiment;

FIGS. 5A and 5B are time charts showing an operation of the fuel pump according to the fuel pump;

FIGS. 6A1 to 6C2 are time charts showing a fuel pressure when a flow control valve is faulty;

DETAILED DESCRIPTION OF EMBODIMENTS

First Embodiment

A first embodiment of a fuel pressure controller applied to a diesel engine will be described hereinafter.

Figure 1:
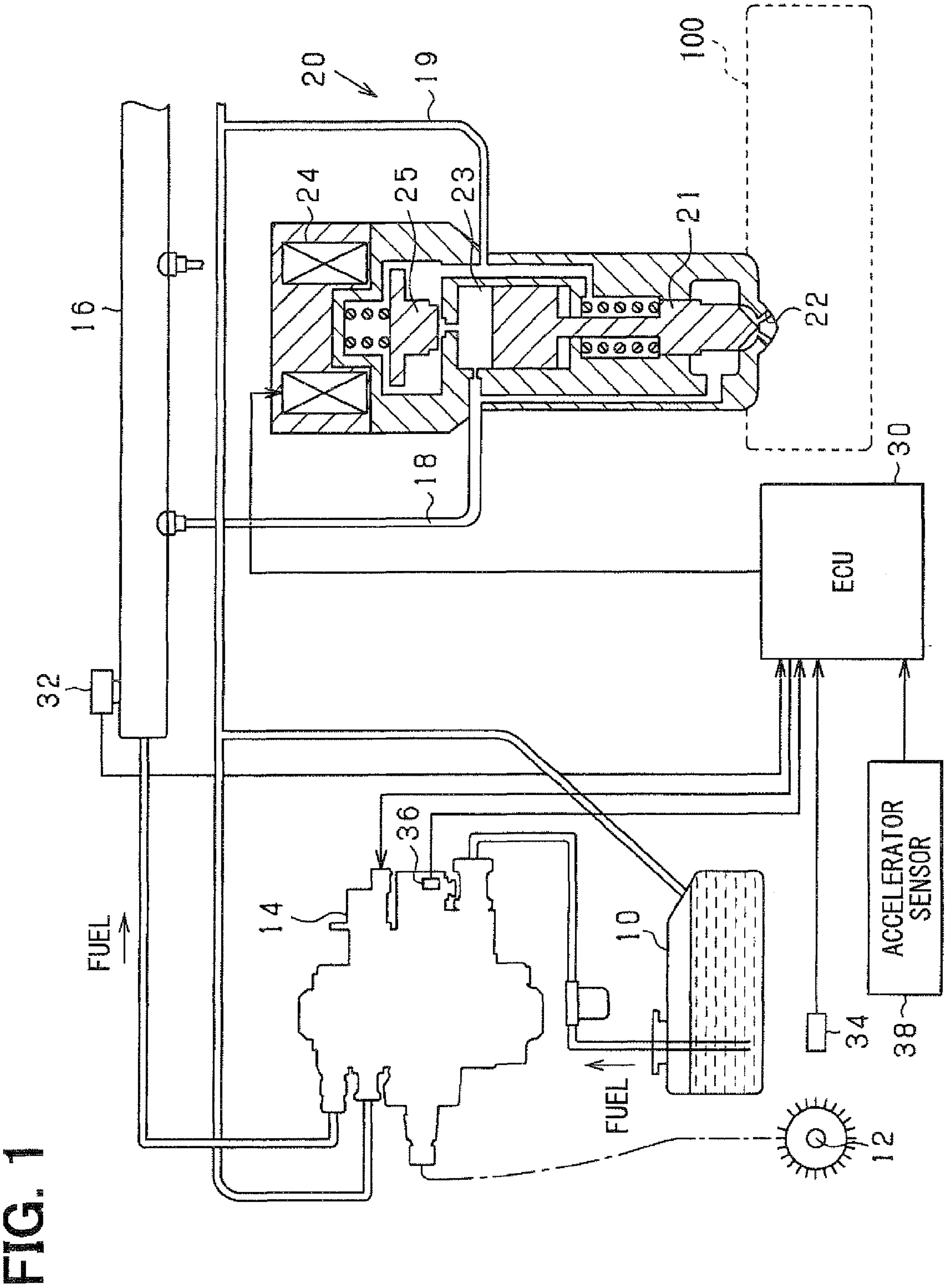
FIG. 1 is a schematic view showing an entire structure of an engine control system according to a first embodiment.

FIG. 1 shows an entire structure of a control system in the first embodiment.

A fuel pump 14 is driven by an engine (not shown) through a crank shaft 12. The fuel pump 14 pumps up fuel (light oil) in a fuel tank 10. The fuel pumped by the fuel pump 14 is fed to a common rail 16. The common rail 16 accumulates the fuel in high pressure. The accumulated fuel is supplied to each fuel injector 20 through a high-pressure fuel passage 18.

The fuel injector 20 has an injection hole 22 protruding into a combustion chamber 100 of the diesel engine. The fuel injector 20 has a nozzle needle 21 which opens/closes the injection hole 22. The nozzle needle 21 receives fuel pressure of high-pressure fuel from the common rail 16 through the high-pressure fuel passage 18. Specifically, the nozzle needle 21 receives the fuel pressure in both directions of opening and closing the injection hole 22. A back-pressure chamber 23 is filled with fuel which applies a fuel pressure on the nozzle needle 21 in a direction of closing the injection hole 22. The back-pressure chamber 23 communicates to a low-pressure fuel passage 19 and the fuel tank 10 when the valve 25 driven by a solenoid 24 is opened. The valve 25 is opened or closed by the solenoid 24, whereby the nozzle needle 21 is displaced to open or close the fuel injector 20.

Figure 2:
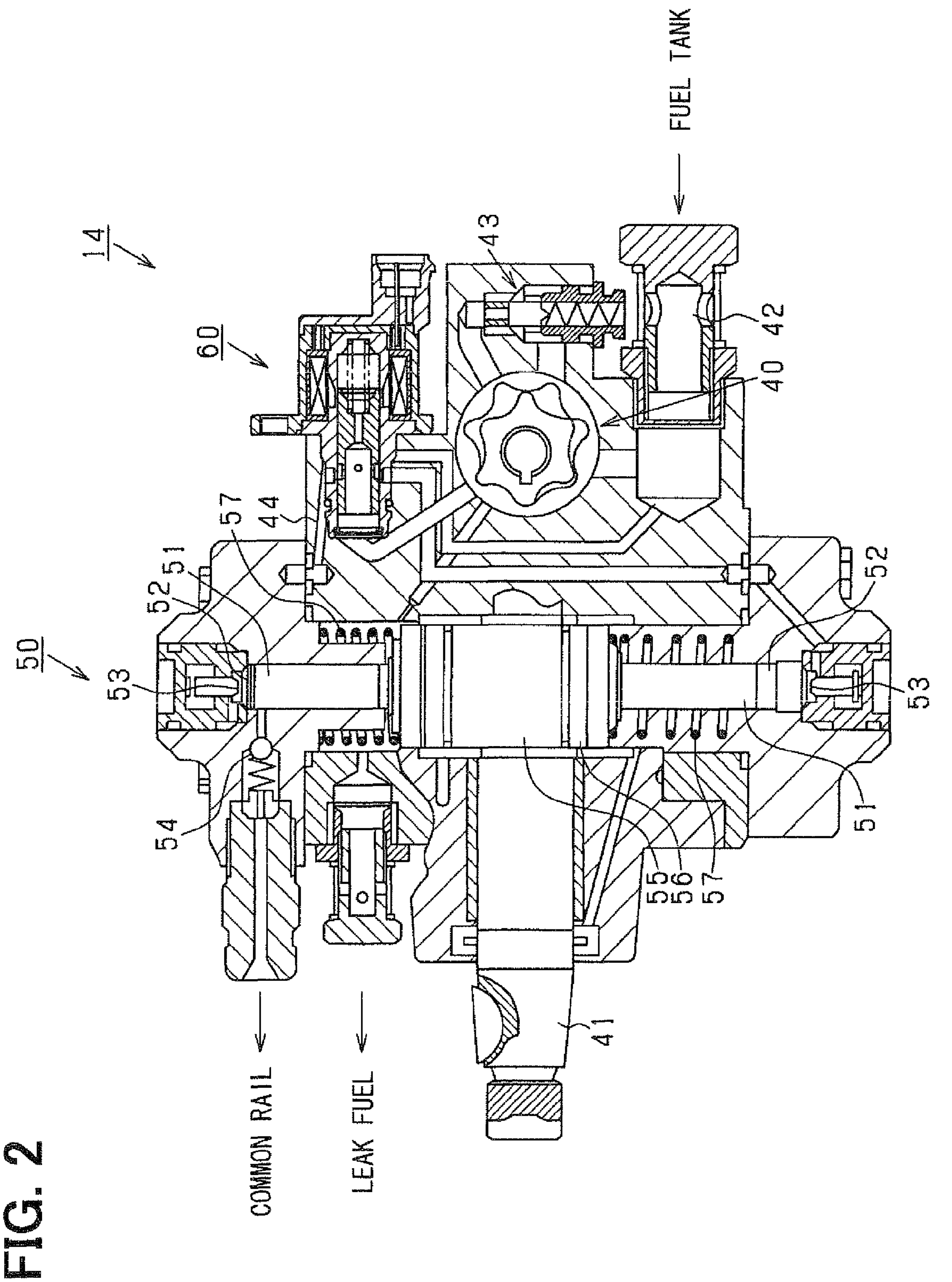
FIG. 2 is a cross sectional view showing a fuel pump according to the first embodiment.

FIG. 2 is a cross sectional view showing the fuel pump 14.

The fuel pump 14 includes a feed pump 40 pumping up the fuel in the fuel tank 10, a high-pressure pump 50 pressurizing the fuel, and a suction control valve 60 controlling a fuel quantity supplied to the high-pressure pump 50 from the feed pump 40.

The feed pump 40 is a trochoid pump driven by a driving shaft 41. The feed pump 40 suctions the fuel in the fuel tank 10 and feeds the fuel to the high-pressure pump 50. The driving shaft 41 is rotated along with the crank shaft 12 of the diesel engine.

A regulator valve 43 communicates a discharge side and a suction side of the feed pump 40 when a discharge pressure of the feed pump 40 exceeds a predetermined pressure, whereby a discharge pressure of the feed pump 40 is regulated.

The suction control valve 60 adjusts fuel quantity supplied from the feed pump 40 to the high-pressure pump 50 through a fuel passage 44.

The high-pressure pump 50 is a plunger pump which pressurizes the fuel. The high-pressure pump 50 is provided with a plunger 51 driven by the driving shaft 41, a pressurizing chamber 52 of which volume is varied according to a reciprocation of the plunger 51, a suction valve 53 controlling a communication between the pressurizing chamber 52 and the feed pump 40, and a discharge valve 54 controlling a communication between the pressurizing chamber 52 and the common rail 16.

The plunger 51 is biased toward a cam ring 56 provided around an eccentric cam 55 of the driving shaft 41 by a spring 57. Along with the rotation of the driving shaft 41, the cam ring 56 reciprocates the plunger 51 between a top dead center and a bottom dead center. When the plunger 52 slides down to decrease the pressure in the pressurizing chamber 52, the discharge valve 54 is closed and the suction valve 53 is opened. Thereby, the fuel is supplied from the feed pump 40 to the pressurizing chamber 52 through the suction control valve 60. When the plunger slides up to increase the pressure in the pressurizing chamber 52, the suction valve 53 is closed. Then, the pressure in the pressurizing chamber 52 reaches a specified pressure, the discharge valve 54 is opened to feed the pressurized fuel toward the common rail 16.

FIG. 3 is a cross sectional view showing a suction control valve 60.

The suction control valve 60 is a normally-closed valve that is closed when the solenoid is deenergized. When the driving current passing through the solenoid is increased, a fluid area through which the fuel flows from the feed pump 40 to the high-pressure pump 50 is increased.

A spool 62 is accommodated in a cylinder 61. The spool 62 slides in the cylinder 61 in its axial direction. The spool 62 is provided with a fuel introducing passage 63 extending in its axial direction and a plurality of communication passages 64 in its radial direction. The cylinder 61 is provided with a plurality of passages 65. The spool 62 is biased by a spring 66 leftwards.

The cylinder 61 is connected with a housing 67. A solenoid 68 is provided in an annular space formed between the cylinder 61 and the housing 67. The solenoid 68 is energized by the ECU 30 through a connector 69.

When the solenoid 68 is energized, a magnetic field is generated to attract the spool 62 rightwards. The spool 62 is displaced against biasing force of the spring 66 to increase the fluid area between communication passage 64 and the passages 65. That is, an opening degree of the suction control valve 60 is increased. The opening degree of the suction control valve 60 is varied according to a command current passing through the solenoid 68. As the command current is increased, the opening degree of the suction control valve 60 is increased. FIG. 3 shows a situation in which the suction control valve 60 is opened to communicate the passage 65 of the cylinder 61 with the communication passage 64 of the spool 62. The low-pressure fuel introduced from the fuel introducing passage 63 is supplied to the high-pressure pump 50 through the communication passage 64 and the passage 65.

An electronic control unit (ECU) 30 controls the diesel engine. The ECU 30 receives detected signals from a fuel pressure sensor 32 detecting fuel pressure in the common rail 16, a crank angle sensor 34 detecting a rotational angle of the crank shaft 12, a fuel temperature sensor 36 detecting a fuel temperature in the fuel pump 14, and sensors detecting conditions of engine system. Further, the ECU 30 receives a detected signal from an accelerator position sensor 38 detecting a position of an accelerator pedal.

Figure 4:
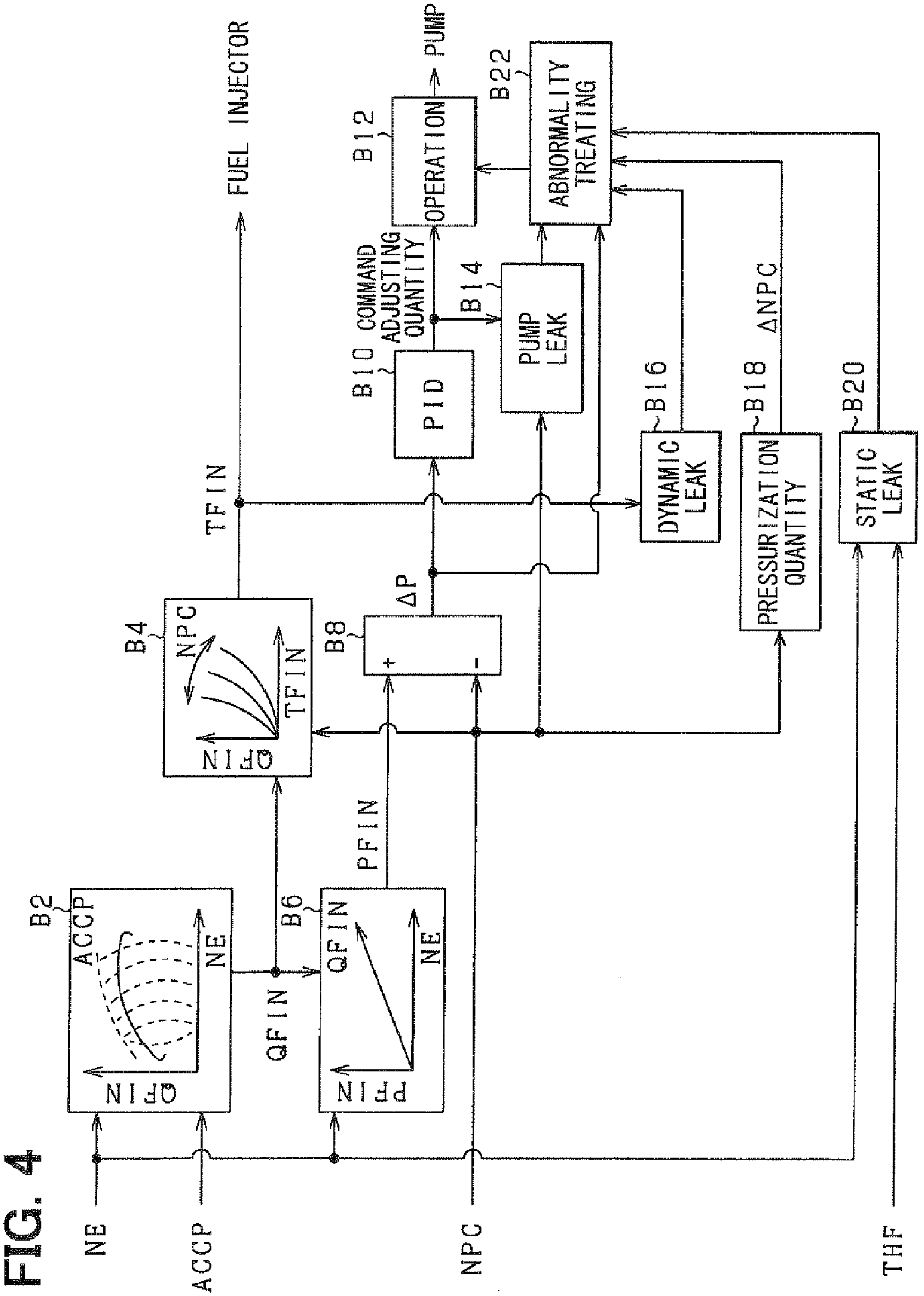
FIG. 4 is a block diagram showing a fuel injection control according to the first embodiment.

The ECU 30 performs a fuel injection control of the diesel engine based on the detected signal from the sensors. FIG. 4 is a chart showing the fuel injection control performed by the ECU 30.

A command quantity computing part B2 computes a command value of fuel injection quantity (command injection quantity QFIN) to the fuel injector 20 based on parameters indicative of a driving condition of the diesel engine. Specifically, a parameter indicative of engine load and an engine speed NE are used as the parameters indicative of the driving condition of the diesel engine. In the present embodiment, the parameter indicative of the engine load is an accelerator operation amount ACCP. As the engine load becomes larger, the command injection quantity QFIN is established larger.

A command period computing part B4 computes a command value of fuel injection period (command injection period TFIN) to the fuel injector 20 based on the command injection quantity QFIN. Specifically, the command injection period TFIN is computed based on a detected fuel pressure (actual fuel pressure NPC) in the common rail 16 and the command injection quantity QFIN. Thereby, a valve opening period of the fuel injector 20 is controlled.

A command pressure establishing part B6 establishes a target value of the fuel pressure (target fuel pressure PFIN) in the common rail 16 based on the parameters indicative of the driving condition of the diesel engine. Specifically, a parameter indicative of engine load and an engine speed NE are used as the parameters indicative of the driving condition of the diesel engine. In the present embodiment, the parameter indicative of the engine load is the command injection quantity QFIN. As the engine load becomes larger, the target fuel pressure PFIN is established larger.

A deviation computing part B8 computes a deviation ΔP of the actual fuel pressure NPC relative to the target fuel pressure PFIN. A feedback controlling part B10 computes a control input in order to feedback-control the actual fuel pressure NPC relative to the target fuel pressure PFIN. A command value of adjusting fuel quantity (command adjusting quantity) to the suction control valve 60 is established as the control input. In the present embodiment, the command adjusting quantity is derived by Proportional-Integral-Derivative (PID) computation. An operation part B12 converts the command adjusting quantity into a command current applied to the suction control valve 60 in order to operate the suction control valve 60. Specifically, a driving signal of specified frequency is applied to the solenoid 68. A duty ratio of the driving signal (Duty ratio) is adjusted to obtain the command current. That is, as shown in FIGS. 5A and 5B, by adjusting the Duty ratio, an average current passing through the solenoid 68 is adjusted to the command current.

An inner periphery of the cylinder 61 and/or an outer periphery of the spool 62 are worn away with age. The inventor of the present invention finds that a sliding friction of the spool 62 increases when the spool 62 slides in the cylinder 61, due to the abrasion of the cylinder 61 and the spool 62. The abrasion of the cylinder 61 and the spool 62 generates abrasion powder between the cylinder 61 and the spool 62.

The spool 62 can not slides in the cylinder 61 smoothly due to the abrasion powder. As shown in FIGS. 6A1 to 6C2, the actual fuel pressure NPC is larger than the target fuel pressure PFIN. FIGS. 6A1 and 6A2 indicate the current (average current) passing through the solenoid 68. FIGS. 6B1 and 6B2 indicate a lift amount of the spoof 62, wherein a lift amount of the spool 62 is defined zero when the suction control valve 60 is fully closed. FIGS. 6C1 and 6C2 indicate the actual fuel pressure NPC. In FIGS. 6A1 and 6A2, solid lines indicate actual current passing through the solenoid 68, and dashed lines indicate current in which the actual fuel pressure follows the target fuel pressure. In FIGS. 6B1 and 6B2, solid lines indicate the actual lift amount of the spool 62, and dashed lines indicate a lift amount in which the actual fuel pressure follows the target fuel pressure. In FIGS. 6C1 and 6C2, solid lines indicate the actual fuel pressure NPC, and dashed lines indicate the target fuel pressure PFIN.

FIGS. 6A1, 6B1 and 6C1 show a case where the operationality of the spool 62 is deteriorated due to the increase in sliding friction when the target fuel pressure is increased. Since the lift amount of the spool 62 is fixed at a value where the actual fuel pressure NPC follows the target fuel pressure PFIN, the actual fuel pressure NPC increases over the target fuel pressure PFIN. A feedback control is performed based on a differential pressure between the target fuel pressure PFIN and the actual fuel pressure NPC, so that the current passing through the solenoid 68 is decreased. When the current passing through the solenoid 68 is decreased to the value "A" at which the spool 62 can be displaced by the biasing force of the spring 66, the spool 62 restarts to be displaced.

FIGS. 6A2, 6B2 and 6C2 show a case where the operationality of the spool 62 is deteriorated due to the increase in sliding friction when the actual fuel pressure NPC follows the fixed target fuel pressure PFIN. Before the operationality is deteriorated, since the current passing through the solenoid 68 is periodically varied by the Duty control, the spool 62 oscillates in its axial direction so that the actual fuel pressure NPC follows the target fuel pressure PFIN. However, in a case that the operationality is deteriorated, the spool 62 is fixed while the lift amount is an upper limit value.

In any cases described above, the current passing through the solenoid 68 is decreased so that the operationality of the spool 62 can be recovered. However, since it takes a long time period to decrease the current to the specified value based on the feedback control, there is a possibility that the actual fuel pressure NPC becomes excessively large relative to the target fuel pressure PFIN.

Figure 7:
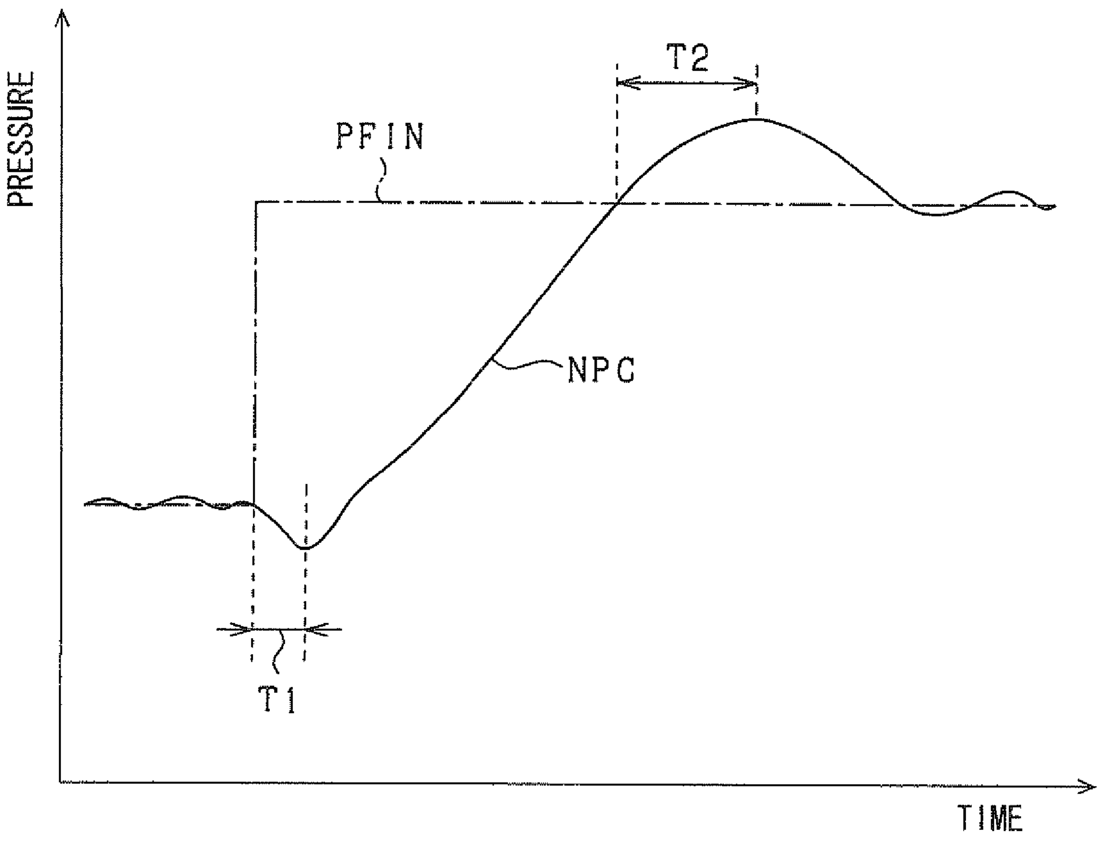
FIG. 7 is a graph for explaining a condition to determine whether the flow control valve is faulty or not.

According to the present embodiment, when a deterioration in operationality of the spool 62 is detected due to the increase in sliding friction, the current passing through the solenoid 68 is compulsorily decreased. Thereby, the current passing through the solenoid 68 is rapidly decreased rather than the feedback control. However, it takes a long time period to detect the deterioration in operationality based on the deviation of the actual fuel pressure relative to the target fuel pressure. Referring to FIG. 7, the above process will be described hereinafter.

FIG. 7 is a graph showing the actual fuel pressure NPC by a solid line in a case that the target fuel pressure PFIN shown by a dashed line is varied stepwise. The target fuel pressure PFIN is rapidly changed when the fuel injection quantity is rapidly increased. Since the fuel injector 20 has higher response than the fuel pump 14, a timing of increasing feed quantity by the fuel pump 14 retards relative to an actual rapid increase in fuel injection quantity. Thus, the actual fuel pressure NPC is temporarily decreased during a time period T1.

Since the integral term of the feedback controlling part B10 continues to increase before the actual fuel pressure NPC follows the target fuel pressure PFIN, even when the actual fuel pressure NPC reaches the target fuel pressure PFIN, the actual fuel pressure NPC overshoots the target fuel pressure PFIN during a time period T2. In this overshoot period T2, the difference between the actual fuel pressure NPC and the target fuel pressure PFIN becomes larger.

During the above periods T1 and T2, the difference between the actual fuel pressure NPC and the target fuel pressure PFIN increases, nevertheless the operationality of the fuel pump 14 does not deteriorated due to the sliding friction. In such a situation, it is desirable to avoid an erroneous detection that the operationality is deteriorated due to the sliding friction. Thus, in order to correctly detect the deterioration in operationality based on the difference between the actual fuel pressure NPC and the target fuel pressure PFIN, it is desirable that a lower limit value of a continuous time period where the difference is larger than a specified period is established long enough.

According to the present embodiment, in order to promptly detect the deterioration in operationality, a fuel quantity actually adjusted by the suction control valve 60 is estimated, and the detection of the deterioration is performed based on the adjusted fuel quantity. Referring to FIG. 4, an estimation process of the fuel quantity adjusted by the suction control valve 60 will be described hereinafter.

A pump leak computing part B14 computes a fuel leak quantity per a specified time period which is not discharged into the common rail 16 based on the command adjusting quantity and the actual fuel pressure NPC. The leak fuel flows out into the low-pressure fuel passage 19 through clearances around the plunger 51, the can ring 56 and the like.

A dynamic leak computing part B16 computes fuel quantity per a specified time period which flows into the fuel injector 20 from the common rail 16 according to the control input of the fuel injector 20. This fuel quantity is total quantity of the fuel injected to a combustion chamber of the diesel engine along with an opening of the nozzle needle 21 and the fuel flowing out toward the low-pressure fuel passage 19 along with an opening of the valve 25. Specifically, the command injection period TFIN is used as a parameter for computing the total fuel quantity.

A pressurization quantity computing part B18 computes a variation amount ΔNPC of the actual fuel pressure NPC per a specified time period based on the actual fuel pressure NPC.

A static leak computing part B20 computes a fuel leak quantity per a specified time period which is not injected by the fuel injector 20 to leak from the high-pressure fuel passage 18 to the low-pressure fuel passage 19 through the fuel injector 20. In order to compute the fuel leak quantity per a specified time period, the engine speed NE is utilized. Further, since the leak quantity depends on a viscosity of the fuel, a parameter having a correlation with a viscosity of the fuel is used. Specifically, a fuel temperature THF is used as the parameter.

It is desirable that the above specified time period corresponds to a specified crank angle.

Figure 8:
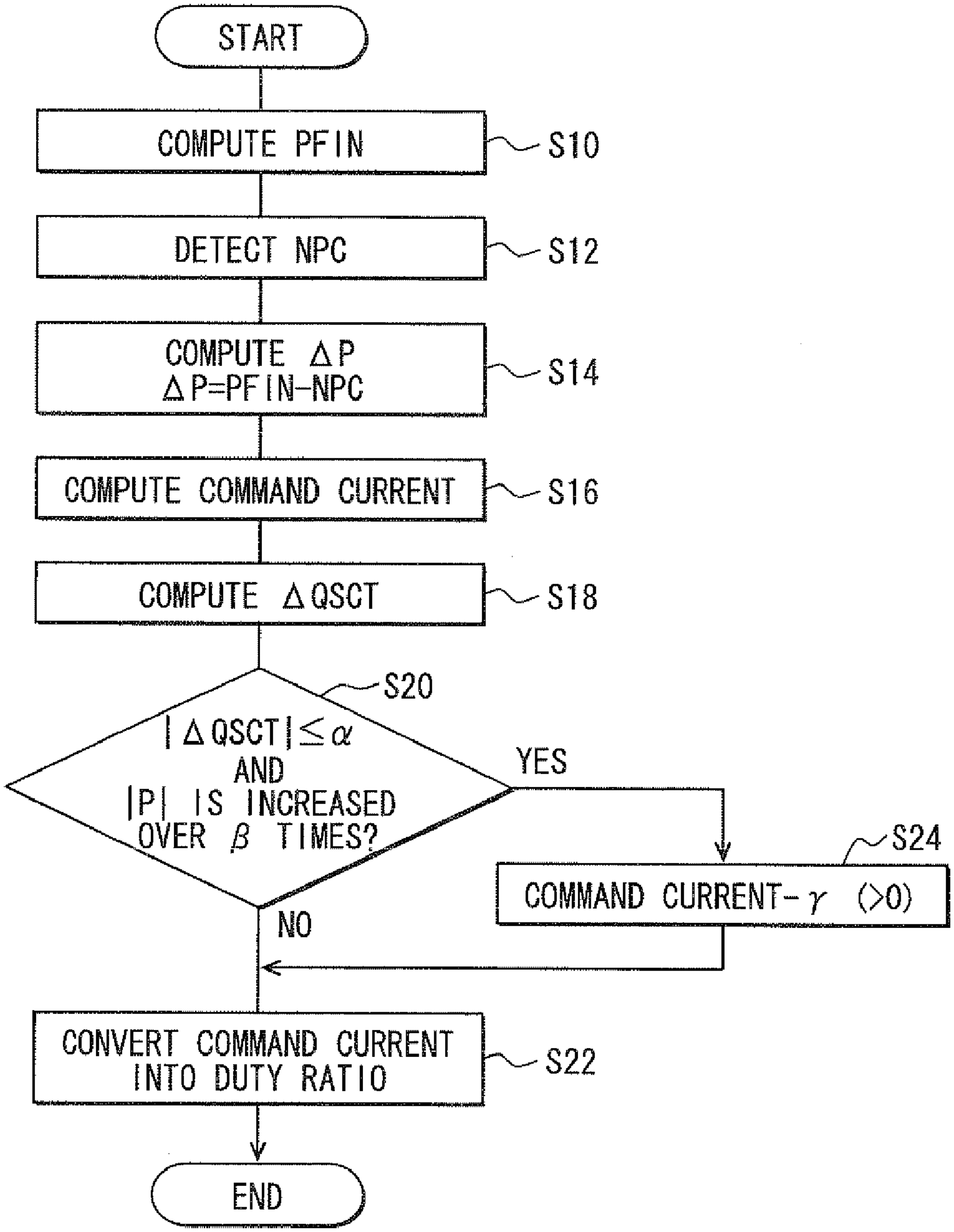
FIG. 8 is a flowchart showing a fuel pressure control process according to the first embodiment.

Based on each leak quantity and the variation amount ΔNPC, an abnormality treating part B22 detects the deterioration in operationality of the fuel pump 14 due to the sliding friction. Then, the abnormality treating part B22 performs the recover process of the fuel pump 14. FIG. 8 is a flowchart showing a process for detecting the deterioration and recovering the fuel pump 14. This process is repeatedly performed at a specified period by the ECU 30.

In step S10, the target fuel pressure PFIN is computed. In step S12, the actual fuel pressure NPC is detected. In step S14, the deviation ΔP is computed. In step S16, the command current to the suction control valve 60 is computed based on the deviation ΔP. After the feedback controlling part B10 computes a command discharge quantity, the command discharge quantity is converted into the command current.

In step S18, a suction quantity variation ΔQSCT of a suction adjusting quantity QSCT is computed. First, the variation amount ΔNPC of the actual fuel pressure NPC is converted into a fuel quantity. Next, a total quantity of the leak quantities respectively computed in the pump leak computing part B14, the dynamic leak computing part B16, and the static leak computing part 820 is added to the converted fuel quantity to derive a current suction adjusting quantity QSCT(n). A difference between a previous suction adjusting quantity QSCT (n−1) and a current suction adjusting quantity QSCT(n) is computed as the suction quantity variation ΔQSCT.

In step S20, it is determined whether an absolute value of the suction quantity variation ΔQSCT is not more than a predetermined value $\alpha$ and an absolute value of the deviation ΔP is increased over a predetermined times $\beta$. This process is for determining whether the deterioration in operationality of the fuel pump 14 exists due to the sliding friction. In a case that the absolute value of the deviation ΔP continues to increase, it is considered that the control input of the suction control valve 60 is varied by the feedback control so that the adjusting quantity is varied. If the absolute value of the suction quantity variation ΔQSCT is not more than the predetermined value a even though the absolute value of the deviation ΔP continues to increase, it is considered that the operationality of the fuel pump 14 is deteriorated due to the sliding friction. The predetermined value $\alpha$ is small enough to be distinguished from the suction quantity variation ΔQSCT in a case that the absolute value of the deviation ΔP continues to increase. The predetermined times $\beta$ is established as small as possible in a range where an erroneous detection can be avoided during the periods T1 and T2 shown in FIG. 7. When the absolute value of the deviation ΔP and/or its increasing amount is not more than a specified value, it is desirable that an affirmative determination should not be done in step S20.

When the answer is Yes in step S20, the procedure proceeds to step S24 in which the command current is compulsorily decreased by a specified value $\gamma$. The decreased command current should be larger than zero. This process is performed over 180° CA.

When the process in step 24 is completed, or when the answer is No in step S20, the procedure proceeds to step S22 in which the command current is converted into Duty ratio. The Duty ratio is defined as an "H" period in one cycle. As the command current is larger, the Duty ratio is larger.

According to the present embodiment described above, following advantages can be obtained.

(1) It is determined that the suction control valve 60 is faulty when the actual fuel pressure NPC deviates from the target fuel pressure PFIN and the suction quantity variation ΔQSCT is not more than the predetermined value $\alpha$. Thereby, a malfunction of the suction control valve 60 can be promptly detected.

(2) It is determined that the suction control valve 60 is faulty when the absolute value of the deviation ΔP is increased and the suction quantity variation ΔQSCT is not more than the predetermined value $\alpha$. Thereby, a malfunction of the suction control valve 60 which should be recovered can be promptly detected.

(3) The suction quantity variation ΔQSCT is estimated based on the fuel injection quantity of the fuel injector 20 and the variation amount ΔNPC of the fuel pressure in the common rail 16. Thereby, the suction quantity variation ΔQSCT can be correctly estimated.

(4) The suction quantity variation ΔQSCT is estimated based on the fuel leakage quantity from the fuel pump 14 and the fuel injector 20. Thereby, the suction quantity variation ΔQSCT can be more correctly estimated.

(5) The actual fuel pressure NPC is feedback-controlled so as to agree with the target fuel pressure PFIN according to an integral control of the deviation ΔP. In this case, it takes a long time period to determine whether the suction control valve 60 is faulty only based on the deviation ΔP. Thus, it is advantageous to utilize the suction quantity variation ΔQSCT.

(6) When a malfunction of the suction control valve 60 is detected due to the sliding friction, an energization operation to the solenoid 68 is compulsorily changed from a normal operation to perform the recover operation. Thus, the suction control valve 60 is smoothly recovered.

(7) The energization control of the solenoid 68 is performed by a time duty ratio control. Thereby, a circuit configuration of an energization control means can be simplified. In this case, even when the discharged quantity is constant, the spool 62 continues to displace with a slight vibration according to the time duty ratio. When the sliding friction is increased to interrupt the slight vibration of the spool 62, a controllability of the fuel pressure is deteriorated. Thus, the above described fault detecting way is useful.

Second Embodiment

A second embodiment will be described hereinafter, focusing on a difference from the first embodiment.

Figure 9A:
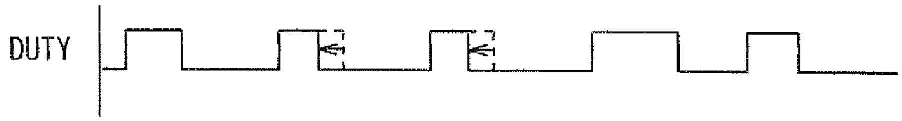
FIGS. 9A and 9B are time charts showing a recovering process according to a second embodiment.
Figure 9B:
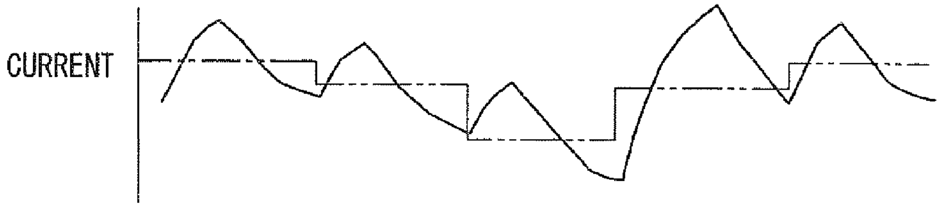

FIG. 9A shows a Duty ratio for energizing the suction control valve 60. FIG. 9B shows a current passing through the solenoid 68 of the suction control valve 60 by a solid line and an average current in one cycle of the Duty control by a double-dashed line. When a malfunction is detected (Yes in step S20), the Duty ratio is compulsorily decreased by a specified amount during "s" cycles. It is supposed that the operationality of the spool 62 is recovered by compulsorily reducing the current during "s" cycles. It is desirable that the "s" cycles are set as short as possible. As described above, also by compulsorily reducing the Duty ratio, the controllability of the fuel pressure can be recovered.

Third Embodiment

A third embodiment will be described hereinafter, focusing on a difference from the first embodiment.

Figure 10A:
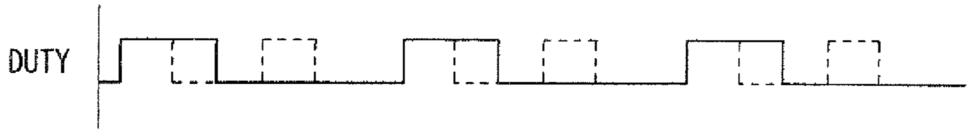
FIGS. 10A and 10B are time charts showing a recovering process according to a third embodiment.
Figure 10B:
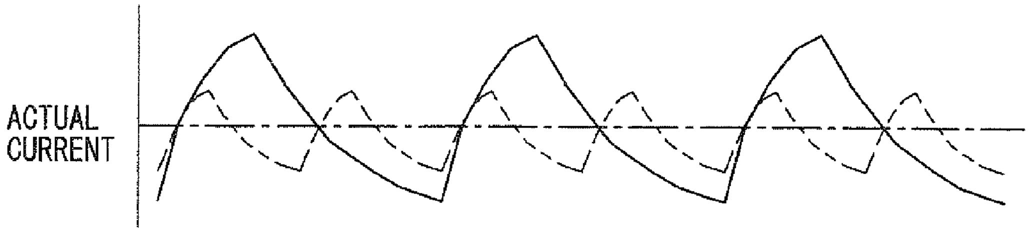

FIGS. 10A and 10B correspond to FIGS. 9A and 9B in the second embodiment. According to the third embodiment, when a malfunction is detected (Yes in step S20), a drive frequency of the Duty ratio is set smaller than usual. Thereby, amplitude of the current can be increased without varying the average current. In FIGS. 10A and 10B, broken lines represent a Duty control of normal frequency, and solid lines represent a Duty control at recover process. By decreasing the frequency, the minimum value of current is decreased and minimum value of electromagnetic force for attracting the spool 62 is decreased. Thus, even though the average current is unchanged, the current is compulsorily decreased in local time scale, so that the operationality can be recovered.

Other Embodiments

The above-mentioned embodiments may be modified as follows.

In the first embodiment, the current is compulsorily decreased during a period which is shorter than a discharge cycle. However, the period is not limited to the period shorter than the discharge cycle. The period can be established as any period in which the operationality is recovered. It is desirable the period is set as short as possible. If the operationality can not be recovered only by one current-decreasing process, the current-decreasing process can be performed intermittently to recover the operationality.

The suction control valve 60 may be a normally open valve.

In a case that the suction control valve 60 is a normally closed valve, it can be determined that the valve 60 is faulty when the deviation ΔP is negative value and its absolute value is increased. In a case that the suction control valve 60 is a normally open valve, it can be determined that the valve 60 is faulty when the deviation ΔP is positive value and its absolute value is increased.

In the above embodiments, the operationality of the spool 62 is recovered by reducing current. However, there is other ways to compulsorily displace the spool 62 so as to recover the operationality.

The feedback control of the actual fuel pressure NPC to the target fuel pressure PFIN is not limited to the PID control.

An estimating method of the suction quantity of the suction control valve 60 is not limited to the way disclosed by the embodiments. When the fuel leak quantity to the low-pressure fuel passage 19 is small, the suction quantity can be estimated without respect to fuel leak quantity. The suction quantity can be estimated based on a fuel injection quantity and a variation in actual fuel pressure NPC. The variation of the suction quantity can be estimated based on the estimated suction quantity. Alternatively, the variation of the suction quantity can be estimated based on the fuel injection quantity and the variation in actual fuel pressure NPC.

Further, instead of estimating the variation of the suction quantity, a displacement amount of the spool 62 can be estimated.

The suction control valve is not limited to the valve shown in FIG. 3. The suction control valve can be replaced by a discharge control valve. The operation signal of the suction control valve is not limited to the time duty signal. An analog current signal can be acceptable.

An actuator of the fuel injector 20 is not limited to a solenoid. A piezoelectric element can be used as the actuator.

The internal combustion engine is not limited to a diesel engine. The present invention can be applied to a direct injection engine.

What is claimed is:

1. A fuel pressure controller provided to a fuel supply system which includes a fuel pump having a flow control valve for adjusting a fuel quantity by displacing a spool by means of a magnetic force generated by a solenoid and a biasing force generated by a spring, an accumulator accumulating a fuel discharged by the fuel pump, and a pressure detecting means for detecting a fuel pressure in the accumulator, the fuel pressure controller feedback controlling a detected fuel pressure in the accumulator to a target pressure by an energization operation to the solenoid, the fuel pressure controller comprising:

an estimating means for estimating a parameter indicative of a displacement amount of the spool based on a parameter for estimating a fuel quantity which is actually adjusted by the flow control valve; and a detecting means for detecting a malfunction of the flow control valve based on a fact that the displacement amount corresponding to an estimation result by the estimating means is not more that a specified value in a situation that the detected fuel pressure deviates from the target pressure.

2. A fuel pressure controller according to claim 1, wherein the detecting means detects the malfunction of the flow control valve based on a fact that an absolute value of a difference between the detected fuel pressure and the target pressure is increased and the displacement amount corresponding to the estimation result by the estimating means is not more that the specified value.

3. A fuel pressure controller according to claim 1, wherein the estimating means estimates a variation in fuel quantity actually adjusted by the flow control valve as the parameter indicative of the displacement amount of the spool.

4. A fuel pressure controller according to claim 1, wherein the fuel in the accumulator is injected by a fuel injector, and the estimating means estimates a parameter indicative of a displacement amount of the spool using the fuel injection quantity by the fuel injector and a variation in pressure in the accumulator as a parameter for estimating a fuel quantity which is actually adjusted by the flow control valve.

5. A fuel pressure controller according to claim 4, wherein the estimating means estimates the parameter indicative of the displacement amount of the spool further using at least one of a leak fuel quantity which is not supplied to the accumulator from the fuel pump and a fuel quantity which is returned to a low-pressure system through the fuel injector without being injected by the fuel injector as a parameter for estimating a fuel quantity which is actually adjusted by the flow control valve.

6. A fuel pressure controller according to claim 1, wherein the feedback control is performed based on an integration value of a difference between the detected fuel pressure in the accumulator and the target pressure.

7. A fuel pressure controller according to claim 1, further comprising a recover process means for recovering the flow control valve from the malfunction by compulsorily changing the energization operation to the solenoid when the detecting means detects the malfunction of the flow control valve.

8. A fuel pressure controller according to claim 1, wherein the energization operation is performed by a time duty ratio control.

9. A fuel pressure control system comprising:

a fuel pressure controller according to claim 1, and the fuel pump pumping up a fuel.

* * * * *